(12) United States Patent
Jahn et al.

(10) Patent No.: US 8,793,309 B2
(45) Date of Patent: Jul. 29, 2014

(54) SYSTEMS AND METHODS FOR THE EFFICIENT EXCHANGE OF HIERARCHICAL DATA

(75) Inventors: Janmartin Jahn, Karlsruhe (DE); Ulrich Rögelein, Gaiberg (DE)

(73) Assignee: SAP AG (TH), Walldorf (DE)

( * ) Notice: Subject to any disclaimer, the term of this patent is extended or adjusted under 35 U.S.C. 154(b) by 177 days.

(21) Appl. No.: 12/876,742

(22) Filed: Sep. 7, 2010

(65) Prior Publication Data

US 2012/0059871 A1    Mar. 8, 2012

(51) Int. Cl.
*G06F 15/16* (2006.01)
(52) U.S. Cl.
USPC .......... 709/203; 709/201; 709/202; 709/246; 709/245
(58) Field of Classification Search
USPC .................... 709/201, 203, 202, 246, 245
See application file for complete search history.

(56) References Cited

U.S. PATENT DOCUMENTS

| | | | | |
|---|---|---|---|---|
| 5,764,978 | A  * | 6/1998 | Masumoto | 1/1 |
| 2006/0286514 | A1 * | 12/2006 | Gross | 434/156 |
| 2007/0005622 | A1 * | 1/2007 | Fernandes et al. | 707/101 |
| 2008/0270529 | A1 * | 10/2008 | Cavagna et al. | 709/203 |
| 2009/0228462 | A1 * | 9/2009 | Frieder et al. | 707/3 |
| 2010/0070747 | A1 * | 3/2010 | Iyigun et al. | 713/2 |

* cited by examiner

*Primary Examiner* — Lai-Dai T Truong
(74) *Attorney, Agent, or Firm* — Finnegan, Henderson, Farabow, Garrett & Dunner, LLP

(57) ABSTRACT

Systems and methods are disclose for facilitating the transfer of hierarchical data to a computer memory are provided. A disclosed method may include receiving an electronic document containing hierarchical data, memory layout information, and memory address information, wherein the memory address information comprises a base address. The data may be restructuring to conform with the memory layout of the computer memory when it is determined, based on the memory layout information, that a memory layout of the hierarchical data does not match the memory layout of the computer memory. Memory address information may be translated when it is determined that the base address is not available in the computer memory. The restructured hierarchical data may be loaded into the computer memory based on the translated memory address information.

15 Claims, 5 Drawing Sheets

SYSTEMS AND METHODS FOR THE EFFICIENT EXCHANGE OF HIERARCHICAL DATA

BACKGROUND

1. Relevant Field

The present invention relates to computer-implemented methods and systems for exchanging hierarchical data.

2. Background Information

Internet-based computing environments have grown in popularity in recent years to due to the ubiquity of web browsers and the convenience of using a cross-platform web browser as a client. Within this framework, web applications represent the corollary to distributed client software applications in traditional client-server paradigms. Web applications permit users to operate software with a minimal exposure to the details or infrastructure present on the server systems in the internet "cloud". From the application provider's perspective, web applications are particularly attractive because their inherent cross-platform nature allows them to be updated and maintained at the server without the costly and tedious task of distributing and installing software on every client machine.

One example of a web application is Web Dynpro offered by SAP AG. Web Dynpro ("WD") is a web application user interface technology that is enabled by the SAP NetWeaver® platform. Like many web applications, WD separates the interface from the underlying data and application logic by exchanging with a server hierarchical data in the form of one or more standard data definition languages, such as the Web Services Definition Language (WSDL), XML schema (xsd), or specialized XML languages, such as cXML, or eBXML. The hierarchical data objects encoded in these documents may be, for example, an invoice, expense report, or purchase order.

Current data definition languages, such as XML, are string-based in that they encode data hierarchical data within string tags. Current client-server solutions exchanging these documents must therefore perform extensive string processing on the server and client. On the server side, the hierarchical data must be converted into multiple string tags that specify the data objects' hierarchical organization. The number and duplicity of strings that may be encoded greatly increases processing time and file size. Moreover, even greater inefficiencies exist on the client side, where, upon receiving the XML document, the client must parse, validate, and convert each data object, node-by-node in order to construct a useable document object model (DOM). Moreover, the mechanisms currently used by clients to create a DOM in memory do not provide an optimized memory layout, and therefore often suffer from poor cache utilization.

In view of the foregoing, there is a need for computer-implemented systems and methods that efficiently exchange hierarchical data by reducing file size, reducing the processing loads on both the client and server, and increasing data locality and cache effects.

SUMMARY

Consistent with embodiments of the present invention, systems and methods for facilitating the transfer of hierarchical data to a computer memory are provided.

In accordance with one embodiment, a computer-implemented method for facilitating the transfer of hierarchical data to a computer memory may comprise receiving an electronic document containing hierarchical data, memory layout information, and memory address information, wherein the memory address information comprises a base address. The method may further comprise restructuring the hierarchical data to conform with the memory layout of the computer memory when it is determined, based on the memory layout information, that a memory layout of the hierarchical data does not match the memory layout of the computer memory and translating the memory address information when it is determined that the base address is not available in the computer memory. The method may further comprise loading the restructured hierarchical data into the computer memory based on the translated memory address information.

According to another embodiment, a computer system for facilitating the transfer of hierarchical data may comprise a non-transient memory that stores instructions and a processor configured to execute the instructions to perform stages. One stage may comprise creating a document in a computer memory, wherein creating the document comprises. Another stage may comprise encoding, in the document, a plurality of data nodes corresponding to a plurality of objects in a hierarchical data structure. Additional stages may comprise encoding, in the document, memory layout information corresponding to a memory layout of the computer memory and address information associated with the plurality of data nodes. A further stage may comprise transferring, over an electronic network, the document to a client terminal.

In accordance with yet another embodiment, a tangible computer-readable medium comprising instructions, which when executed by a processor, cause a computer to perform a method for facilitating the transfer of hierarchical data may comprise creating a document in a computer memory, wherein creating the document comprises encoding, in the document, a plurality of data nodes corresponding to a plurality of objects in a hierarchical data structure. The method may further comprise encoding, in the document, memory layout information corresponding to a layout of the computer memory and memory address information associated with the plurality of data nodes. The method may also include transferring, over an electronic network, the document to a client terminal.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments of the invention and, together with the description, serve to explain various embodiments and aspects of the present invention. In the drawings.

DETAILED DESCRIPTION

Figure 1A:
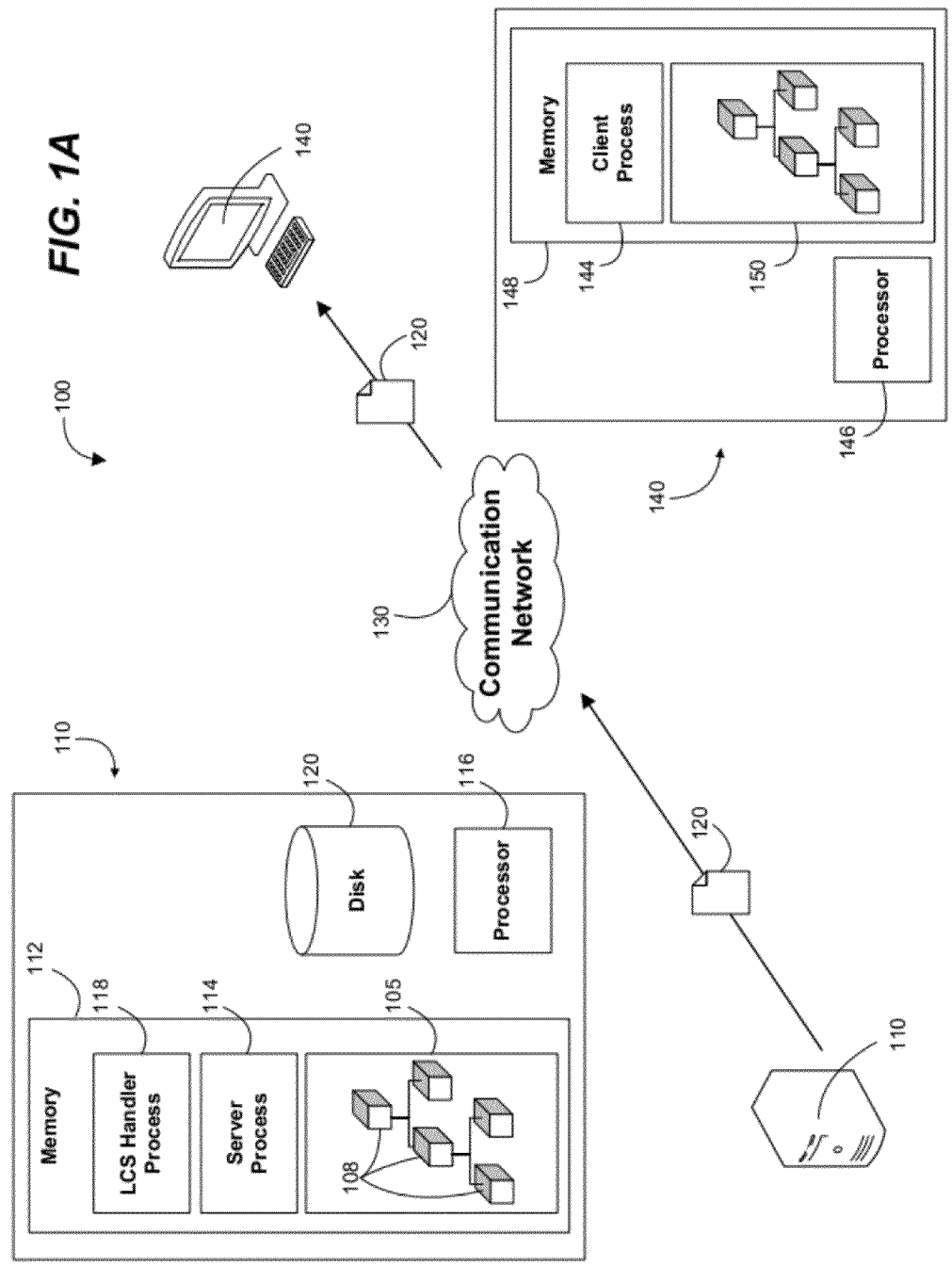
FIG. 1A is a high-level block diagram illustrating an exemplary computer system and communication network consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods or processes. Accordingly, the following detailed description does not limit the invention. Instead, the proper scope of the invention is defined by the appended claims.

FIG. 1A is a high-level block diagram illustrating an exemplary computer system and communication network consistent with the present invention. Computer system 100 may comprise a server 110, a communication network 130, and a client 140. Communication network 102 facilitates communication between a plurality of computers, such as server 110 and client 140. Communication network 102 may include one or more network types, such as a wide-area network (WAN), a local-area network (LAN), or the Internet. In some embodiments, computer system 100 may be a cloud computing environment.

Server 110 may include a processor 116 and a memory 112. Memory 112 may contain instructions that, when executed by the processor, perform a Linear Compound Storage (LCS) Handler process 118 and a server process 114. Memory 112 may also contain hierarchical data objects 105, such as an invoice, expense report, purchase order, or any other various forms of data that may be conceptualized in a hierarchical manner. As described in more detail below, LCS handler process 118 and server process 114 may, in some embodiments, cooperate to encode an electronic document containing hierarchical data 105 so that the data may be encoded into an electronic document 120 for exchange with a client 140 via communication network 130. One example of an electronic document 120 containing hierarchical data consistent with embodiments of the present invention is referred to herein as a linear compound storage document ("LCS document"). An exemplary embodiment of an LCS document is discussed in more detail below with respect to FIG. 3.

Server process 114 may be performed on the server 110 to create an electronic document containing hierarchical data corresponding to data objects 108 in a hierarchical data structure 105 residing in memory 112. The hierarchical data structure 105 may exist in any of various forms in the memory 112 including a binary tree, heap, table, or any other acceptable format for storing data objects in memory. Server process 114 encodes data and information in the LCS document 120 such that, in some instances, a client process 144 on a client 140 receiving the document may load the hierarchical data directly, or after minor restructuring, into the client memory 148. In such cases, the client may advantageously avoid undertaking costly computational processes (e.g., parsing, validation, data conversion, and/or model creation) typically associated with many text-based document transport formats, such as XML. An exemplary server process for creating an LCS document 120 capable of achieving these benefits will be described in greater detail below with regard to FIG. 2. As used herein, receiving the document may refer to opening a data stream between the client 140 and server 110 in which LCS document 120 is streamed via communication network 130.

Figure 1B:
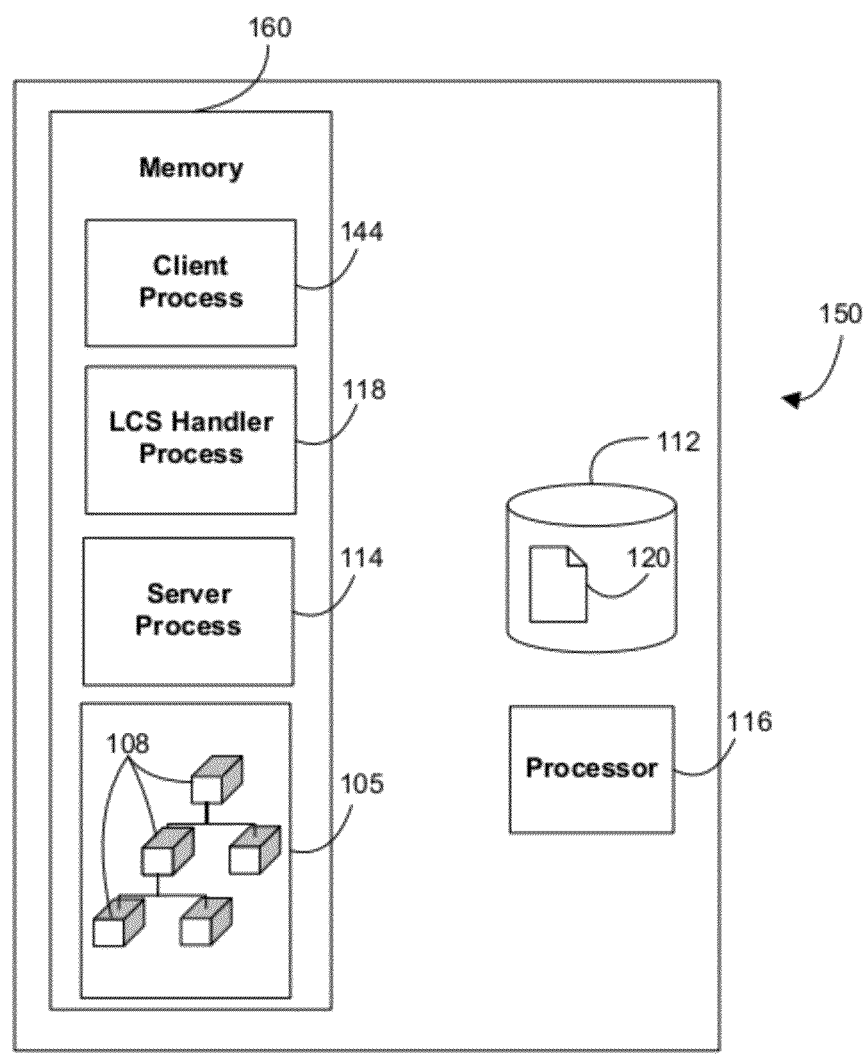
FIG. 1B illustrates another exemplary embodiment consistent with the present invention in which the server and client may be the same computer system.

FIG. 1B illustrates another embodiment consistent with the present invention in which the server 110 and client 140 may be the same computer system 150. Accordingly, the server process 114 and client process 144 may be performed by the same processor 116. In such embodiments, the LCS document 120 may be created in memory 160 and then stored in the same or another local memory storage location, for example, a hard disk 112 or database repository (not shown). At a later time, when a user or application wishes to load the hierarchical data into memory for processing, the client process 144 may operate to load data contained in LCS document 120 into memory 160. Accordingly, in this embodiment, rather than receiving the document from a remote computer via a communication network, the computer system may receive the document from a local memory storage location. This may be beneficial in systems that store large files on hard disk or where hierarchical data is shared between processes and applications.

In another aspect, an LCS handler 118 may optimize the hierarchical data structure in memory. Conventional mechanisms for storing data structures in memory store data objects without making any particular effort to maintain related data in nearby memory locations. As a result, related data objects, such as those present in hierarchical data structures, often become scattered across the memory heap as the tree is created and/or modified. As a result, conventional in-memory data structures typically suffer from poor cache utilization. An LCS handler, such as the one described herein, may mitigate these negative effects by placing related data in nearby memory locations, thereby better harnessing cache effects. LCS handler 118 may thus dynamically place data objects 108, as they are added to the hierarchical data structure 105, into linear, consecutive memory addresses in memory. Additionally, as the data objects are modified and or moved, the LCS handler 118 may re-order and or adjust the contents of the memory 112, 160 such that related data objects 108 of a data structure 105 remain near to one another in memory. In some embodiments, for example, the LCS handler 118 may be configured to maintain the data objects at linear, consecutive memory address locations.

Figure 2:
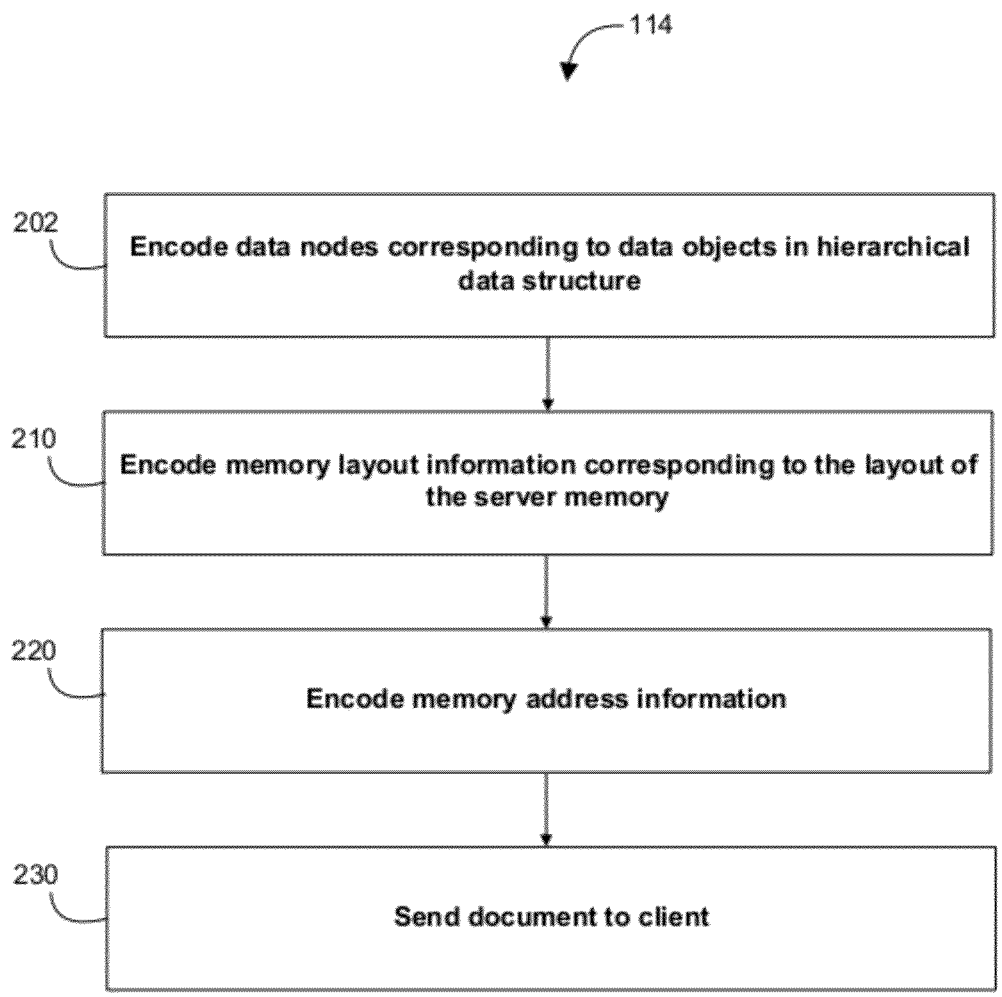
FIG. 2 depicts one exemplary method of creating an LCS document consistent with the present invention.

FIG. 2 depicts one exemplary method of creating an LCS document consistent with the present invention. The steps performed in server process 114 may be performed by the processor 116 of server 110. Server process 114 may begin at step 202, by encoding in the document data nodes corresponding to objects in a hierarchical data structure. At step 210, memory layout information corresponding to the layout of the memory 112, 160 of the computer system in which the hierarchical data structure exists may be encoded into the document 120. As described in more detail below, memory layout information stored in the document may be used by the client 140 to determine whether the data may be loaded directly into the memory 112, 160 of the client 140, or whether the data must be restructured to conform with the memory layout of the client 140. Server process 114 may then proceed to step 220 at which server 110 may store, in the document 120, memory address information. As described below, this memory address information may reflect the actual and/or relative memory addresses of the data objects 108 contained in the hierarchical data structure 105 that exists in the memory of the server 110. At step 230, the server may send the LCS document 120 to the client, where the client 140 may use the memory address information may to determine whether the data in the LCS document 120 may be directly loaded into the same memory locations in the server memory 112 or whether the memory addresses require translation.

In some embodiments, server process 114 may store data nodes into the LCS document 120 simultaneously with the creation of their corresponding data objects in memory on the server 110. As used herein, storing the data nodes simultaneously refers to creating or modifying data in the LCS document 120 as the data structure is being constructed or modified in memory 112, 160. By doing so, the server process 114 may obviate the need for any additional processing before transferring the LCS document 120 to a client 140. Moreover, the server process 114 may cooperate with the LCS handler 118 process such that any modification the LCS handler 118 makes to data objects in memory will automatically be reflected in the LCS document 120. As a result, optimizations in the memory placement of data objects performed by the LCS handler 118 may advantageously be replicated in the LCS document 120. For example, when the LCS handler 118 maintains data objects in linear, consecutive memory addresses, the optimized layout may also be reflected in the memory address information stored in the LCS document 120 and ultimately in the memory of the client 140 with which the data is ultimately exchanged.

Figure 3:
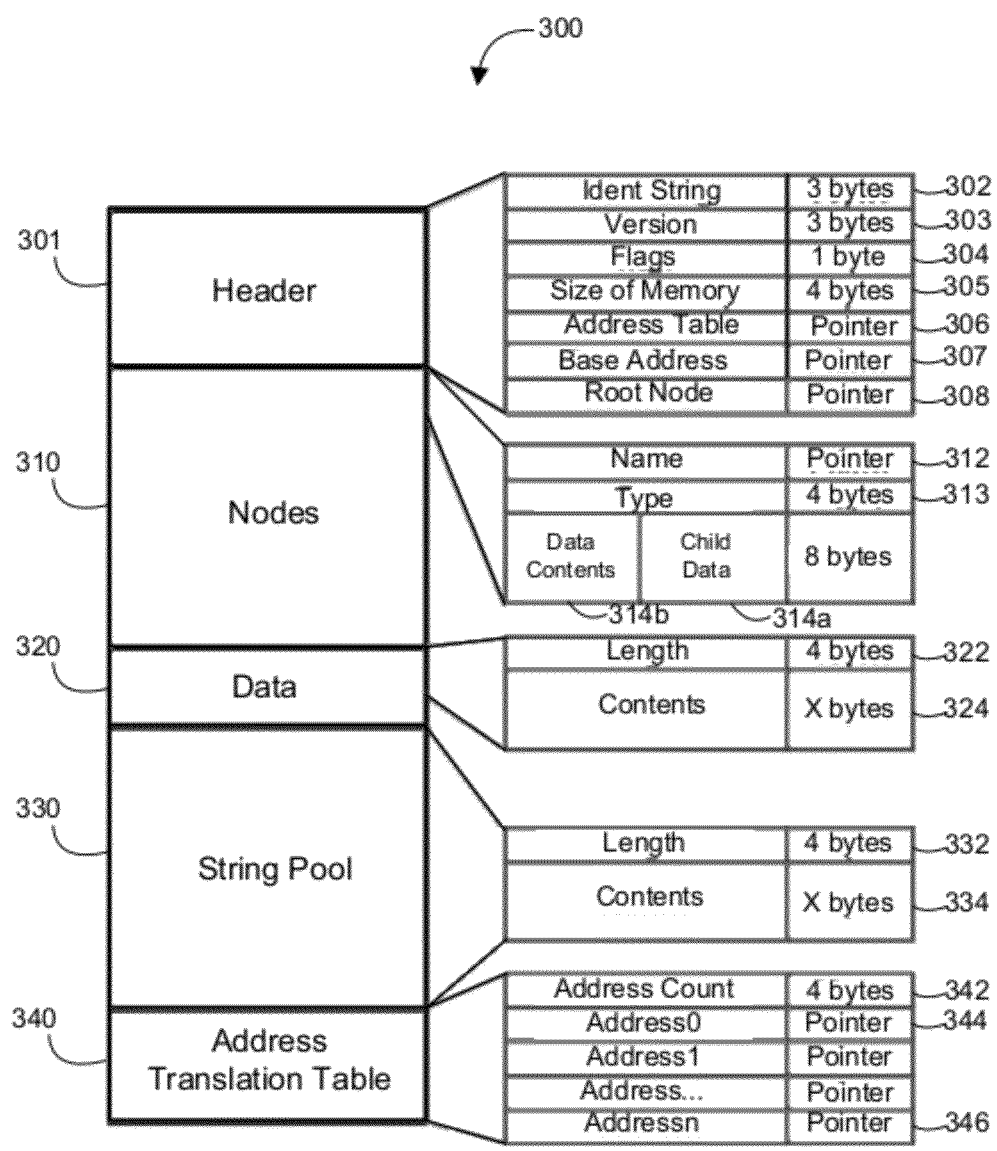
FIG. 3 depicts an LCS document format that may be used for exchanging hierarchical data consistent with the present invention.

Referring now to FIG. 3, it depicts an exemplary LCS document format that may be used for exchanging hierarchical data consistent with the present invention. As noted above, an LCS document 120 stores a hierarchical data structure 105 that may be transferred to a client 140 such that the client process may efficiently load the hierarchical data 105 into the client's memory 146. The various portions of the LCS document 300 format discussed with regard to FIG. 3 may be created and maintained by server process 114 of server 110.

In one aspect, an LCS document 120 may contain memory layout information. As used herein, memory layout information may refer to any information that indicates, explicitly or inherently, whether the memory layout of the data contained in the LCS document 120 conforms with the memory layout of the client memory 146. For example, memory layout information may be stored in header 301 such that the client 140 may examine the header and identify various relevant aspects of the memory layout that may impact the compatibility of the data contained in the LCS document 120 with that of the client memory 146 in which the client wishes to load the hierarchical data 105. In one example, the header may include an identification string 302; version identifier 303, and flags 304. Flags 304 may include memory layout information such as pointer width, word and byte endianess, memory alignment and string encoding associated with the data contained in the LCS document 120. It should be noted that a header merely represents one of many acceptable means of encapsulating memory layout information in an LCS document 120.

In another aspect, LCS document 300 may contain memory address information. As used herein memory address information may refer to any information that indicates, either an exact or relative memory location of the original hierarchical data 105 now contained in the LCS document 120. By storing this memory address information, the client process 144 of client 140 may quickly and efficiently evaluate whether the client may simply load the data directly into the memory addresses identified in the LCS document, or whether the addresses require translation. In exemplary LCS document 301, memory address information is contained the form of address table 306 and base address 307, each stored in the header; as well as address count 342 and address0 344 through addressn 346 stored in an address translation table 340. In this example, each of these items is stored as a pointer. As described in more detail below with respect to the client process of FIG. 4, the pointers stored in the address translation table may require translation if the memory block beginning at the base address is unavailable in the client. Address translation table 340 may store an address count 342 and a number of actual address, relative addresses, or pointers that may be translated if one or more memory addresses are unavailable to the client. Additionally, these addresses may themselves be subject to translation. In some embodiments, addresses in the LCS document may be stored relative to a base address 306.

Data nodes 310 in the LCS document may be stored in a hierarchical structure, which may be conceptually organized as a tree. Each node may have a number of attributes and a value or any number of children. A node that has one or more children may or may not have a value, i.e. data contents. Attributes, as referred to herein, are child nodes that may not have children themselves. Data may take any form, as dictated by the type of data stored in the hierarchical data structure, for example, integer or floating-pointer numbers, pointers to strings in a string pool 330 or pointers to blob data 324 in a data section 320. Therefore unlike XML documents, binary data such as images may be encoded into the document. In the exemplary data section illustrated at item 310, each node may include a name 312, a type 313, data contents 314*a* and child data 314*b*.

In another aspect, string pool 330 may be stored in the LCS document in order to keep the file size of the LCS document low, thereby enhancing the transfer speed of the LCS document. As noted above, text-based document formats like XML include large amounts of text that consume file space and necessitate excessive parsing. An LCS document may, in some embodiments, limit the number of strings stored in the document through the use of a string pool 330. The string pool may contain only a single instance of every string name stored in the document. Because strings are generally ready-only data types, all string data in the LCS document, such as the node name 312, may simply take the form of a pointer to the appropriate string in the string pool 330. Accordingly, where, for example, several attributes stored in the LCS document are described by the same string, they may all reference the same string in the string pool.

It should be noted that the various indicated byte sizes shown in FIG. 3 are provided for exemplary purposes only and should not be considered limiting in any way. Moreover, no particular ordering of the variety of segments of the LCS document format 300 is required. Nor is the listing of segments or elements provided indispensable or exhaustive. The types of information that may be consistent with the scope of the invention should be determined with respect to the claims that follow this description.

Figure 4:
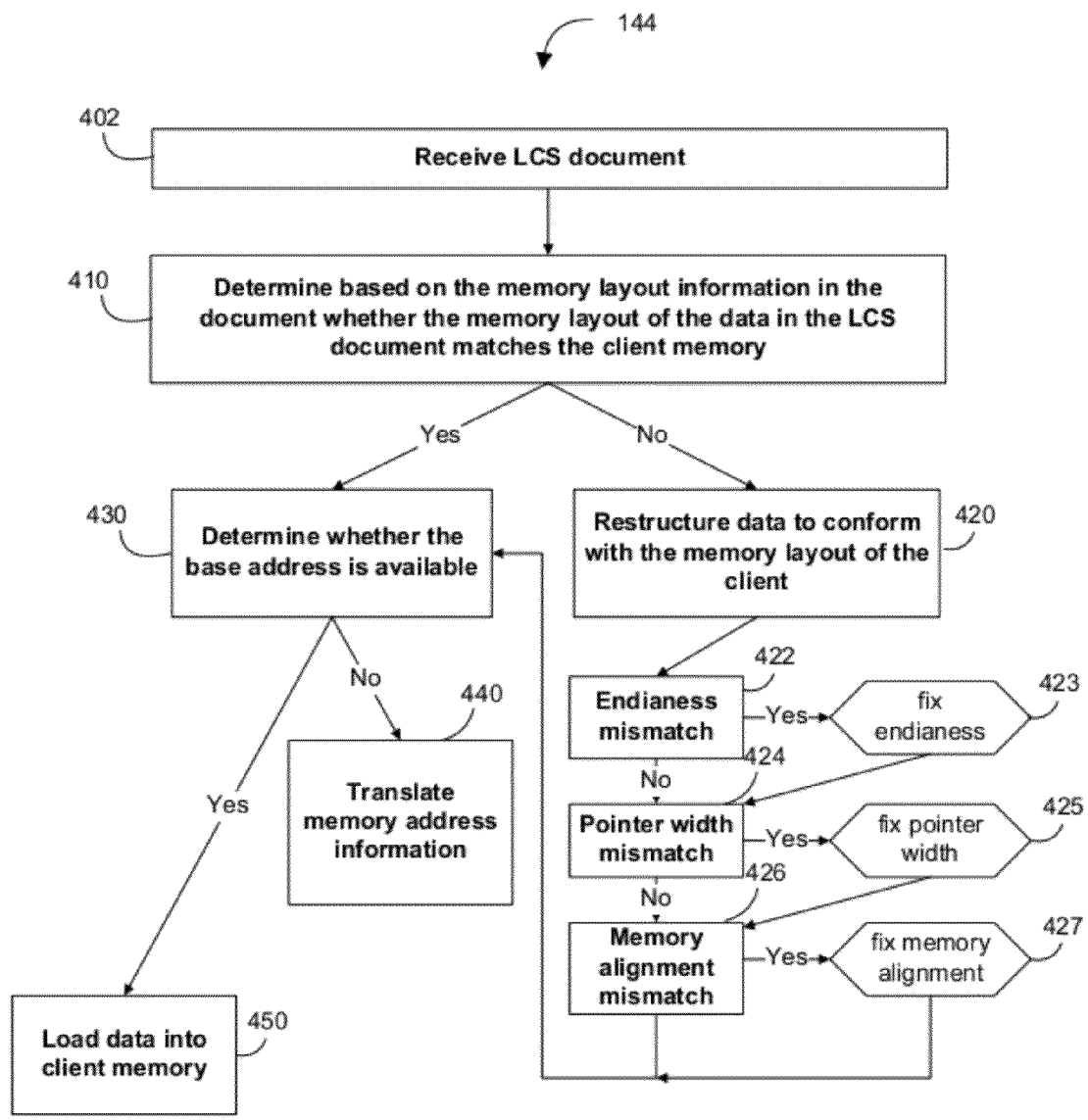
FIG. 4 illustrates a flowchart of an exemplary client process for processing a document containing hierarchical data consistent with the present invention.

Continuing to the next figure, FIG. 4 illustrates a flowchart of an exemplary client process for processing a document containing hierarchical data consistent with the present invention. Processing LCS document 120 on the client 140 may allow the client to load the data nodes contained as data objects into memory. This may allow the client recreate the hierarchical data structure 105 in memory, without parsing the parsing and model creation required by string-based standards, such as XML. Because the data object model is inherently contained in the document, it may automatically exist in memory once when the data in the LCS document is loaded into memory. Moreover, in at least some embodiments consistent with the invention, data encoded in the LCS document may be directly loaded into the client memory without any restructuring or address translation.

The client process 144 may begin at a step 402, in which the LCS document is received. In one aspect, LCS document may be received from a remote computer, such as a server 110 via a communication network 130; and client process may be performed by a processor 116 of server 110. Alternatively, however, in other embodiments the LCS document may be received from a local memory storage location, such as a hard drive 120 or a database; and the client process 144 may be performed by a processor 116 on the local computer 150.

Next, at step 410 the client process may determine based on the memory layout information whether the data stored in the document matches the memory layout of the memory of the receiving computer. To make this determination, client process 410 may evaluate one or more of information items stored in the LCS document that are indicative of the memory layout of the computer memory in which the data objects stored in the LCS document originated, such as memory 112, 160 of the server 110. As noted above with regard to FIG. 3, this original memory layout may be indicated by, for example, the size of the memory 305, and/or flags 304 that may specify pointer width, word and byte endianess, memory alignment, and string encoding. These information items may be compared with the memory layout of the memory of the receiving computer in which the data objects are to be loaded.

If the client process determines at step 410 that one or more aspects of the memory layout information do not match (step 410, No), then the process may restructure the data to conform with the memory layout of the client memory (step 420). If it is determined that the endianess does not match (step 422), then the client process may fix, at step 423, the endianess by re-ordering the words, bytes, or bits within the data words of the data contained in the LCS document as necessary to conform with the memory layout of the client computer's memory. This may occur, for example, where the server stores data least significant byte first, i.e., in little-endian format, but the client stores data most significant byte first, i.e., in big-endian format. Next, if it is determined that the pointer width does not match (step 423), then the client process may adjust, at step 425, the width of pointers in the LCS document, such as pointers that may be contained in address translation table 340 or header 301, if any. Then, if it is determined that the memory alignment does not match (step 426), then the client process may fix, at step 427, the memory alignment by adjusting the data alignment and/or data structure padding associated with the data stored in the LCS document.

Once the data in the LCS document has been restructured to conform with memory layout of the client memory, or, if it is determined that the memory layouts match, the client process may then proceed to step 430. In embodiments in which the server process and client processes are performed by the same computer, such as the embodiment described above with respect to FIG. 1B, the determination of whether the memory layouts match may not require any affirmative evaluation of the memory layout information contained in the LCS document. For example, where the data is to be loaded from the LCS document into the same memory it was originally created, it may be assumed that the memory layouts match.

At step 430, the client process may next determine whether the base address is available in the client memory. In one aspect, the client process may make this determination by reading the base address 306 and memory size 305, which may be stored in a header 301 of the LCS document and then check whether a chunk of memory is available for allocation beginning at the base address indicated in the LCS document.

If the base address is available, then at step 450 the data may simply be loaded directly into the client memory beginning at the same base address in the client memory.

Alternatively, if at step 430 the client process determines that the base address is not available in the client memory, then the client may translate the memory address information stored in the LCS document. In this manner, the entire chunk of memory represented in the LCS document may be rebased. In one aspect, rebasing the memory may be facilitated using address translation table 340. As described in more detail above, address translation table 340 may store the addresses that should be translated in order to load the data into the client memory. The client 140 may first allocate an available memory address that will become the new base address relative to which all addresses identified in the address translated table may be translated. Then, based on the difference between the base address in the LCS document 120 and the available address in the client memory 148, the client may modify each address or pointer in the address translation table the same by the same amount relative to the available address. Once the addresses have been adjusted relative to the new base address, the data stored in the LCS document 120 may be loaded directly into the memory of the client 148. Loading the data may involve, for example, duplicating, serializing, moving, or transferring the data into the memory of the client.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in many other ways, using equivalents and alternatives that do not depart from the scope of the following claims.

Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of this invention, or it may be more convenient to construct a specialized apparatus or system to perform the required methods and techniques.

Systems and methods consistent with the present invention also include non-transient computer-readable storage media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level of code that can be executed by the computer using an interpreter.

We claim:

1. A computer-implemented method for facilitating the transfer of hierarchical data, the method comprising:

creating a document in a computer memory, wherein creating the document comprises:
  encoding, in the document, a plurality of data nodes corresponding to a plurality of objects in a hierarchical data structure;
  encoding, in the document, memory layout information corresponding to a memory layout of the computer memory;
  encoding, in the document, memory address information associated with the plurality of data nodes, the memory address information corresponding to linear, consecutive memory address locations; and
  transferring, over an electronic network, the document to a client terminal, the document comprising linear, consecutive memory address locations for all of the objects in the hierarchical data structure, the objects having a characteristic such that they may be directly loaded into a client memory when client memory locations corresponding to the memory layout information are available, and having a characteristic such that they may be loaded into translated client memory locations when client memory locations corresponding to the memory layout information are unavailable.

2. The computer-implemented method of claim 1, wherein encoding the plurality of data nodes further comprises encoding each of the plurality of nodes in the document simultaneously with the creation of the corresponding object in the data structure.

3. The computer-implemented method of claim 1, wherein encoding memory address information comprises encoding the plurality of addresses in an address translation table, wherein the plurality of addresses contain memory information relative to the base address.

4. The computer-implemented method of claim 1, wherein the method further comprises encoding, in the document, a header containing the base address and the memory layout information, wherein the memory layout information comprises at least one of an endianess, a memory alignment, and a pointer width.

5. The computer-implemented method of claim 1, wherein the method further comprises encoding, in the document, a string pool associated with the data nodes.

6. A computer system for facilitating the transfer of hierarchical data, the computer system comprising:
  a non-transient memory that stores instructions; and
  a processor configured to execute the instructions to perform stages comprising:
    creating a document in a computer memory, wherein creating the document comprises:
      encoding, in the document, a plurality of data nodes corresponding to a plurality of objects in a hierarchical data structure;
      encoding, in the document, memory layout information corresponding to a memory layout of the computer memory; and
      encoding, in the document, memory address information associated with the plurality of data nodes, the memory address information corresponding to linear, consecutive memory address locations; and
      transferring, over an electronic network, the document to a client terminal, the document comprising linear, consecutive memory address locations for all of the objects in the hierarchical data structure, the objects having a characteristic such that they may be directly loaded into a client memory when client memory locations corresponding to the memory layout information are available, and having a characteristic such that they may be loaded into translated client memory locations when client memory locations corresponding to the memory layout information are unavailable.

7. The computer system of claim 6, wherein encoding the plurality of data nodes further comprises encoding each of the plurality of nodes in the document simultaneously with the creation of the corresponding object in the data structure.

8. The computer system of claim 6, wherein encoding memory address information comprises encoding the plurality of addresses in an address translation table, wherein the plurality of addresses contain memory information relative to the base address.

9. The computer system of claim 6, wherein the method further comprises encoding, in the document, a header containing the base address and the memory layout information, wherein the memory layout information comprises at least one of an endianess, a memory alignment, and a pointer width.

10. The computer system of claim 6, wherein the method further comprises encoding, in the document, a string pool associated with the data nodes.

11. A non-transitory computer-readable storage medium comprising instructions, which when executed by a processor, cause a computer to perform a method for facilitating the transfer of hierarchical data, the method comprising:
  creating a document in a computer memory, wherein creating the document comprises:
    encoding, in the document, a plurality of data nodes corresponding to a plurality of objects in a hierarchical data structure;
    encoding, in the document, memory layout information corresponding to a layout of the computer memory;
    encoding, in the document, memory address information associated with the plurality of data nodes, the memory address information corresponding to linear, consecutive memory address locations; and
    transferring, over an electronic network, the document to a client terminal, the document comprising linear, consecutive memory address locations for all of the objects in the hierarchical data structure, the objects having a characteristic such that they may be directly loaded into a client memory when client memory locations corresponding to the memory layout information are available, and having a characteristic such that they may be loaded into translated client memory locations when client memory locations corresponding to the memory layout information are unavailable.

12. The non-transitory computer-readable storage medium of claim 11, wherein encoding the plurality of data nodes further comprises encoding each of the plurality of nodes in the document simultaneously with the creation of the corresponding object in the data structure.

13. The non-transitory computer-readable storage medium of claim 11, wherein encoding memory address information comprises encoding the plurality of addresses in an address translation table, wherein the plurality of addresses contain memory information relative to the base address.

14. The non-transitory computer-readable storage medium of claim 11, wherein the method further comprises encoding, in the document, a header containing the base address and the memory layout information, wherein the memory layout information comprises at least one of an endianess, a memory alignment, and a pointer width.

15. The non-transitory computer-readable storage medium of claim 11, wherein the method further comprises encoding, in the document, a string pool associated with the data nodes.

* * * * *